W. E. TRUFANT.
TRANSMISSION SHAFT FOR AUTOMOBILES.
APPLICATION FILED MAR. 21, 1907.
1,084,912.
Patented Jan. 20, 1914.
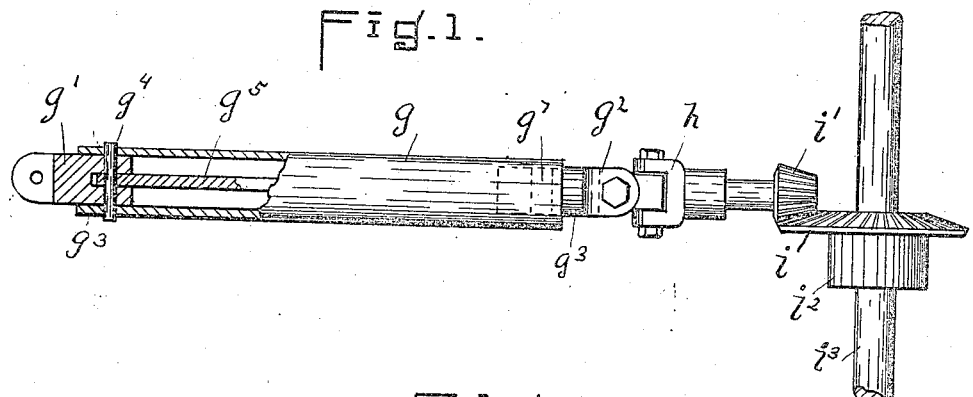
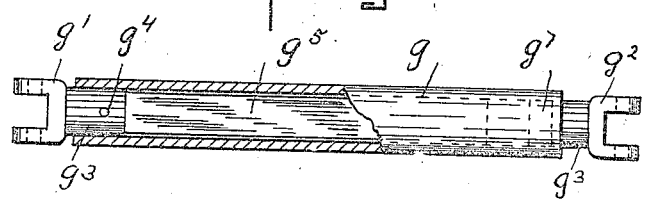
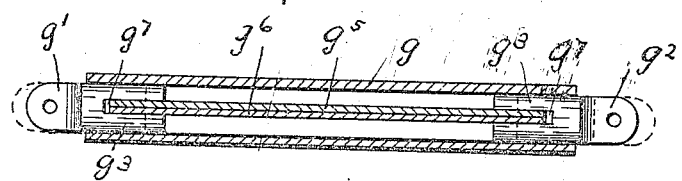

UNITED STATES PATENT OFFICE.

WALTER E. TRUFANT, OF WHITMAN, MASSACHUSETTS.

TRANSMISSION-SHAFT FOR AUTOMOBILES.

1,084,912. Specification of Letters Patent. Patented Jan. 20, 1914.

Application filed March 21, 1907. Serial No. 363,751.

*To all whom it may concern:*

Be it known that I, WALTER E. TRUFANT, of Whitman, in the county of Plymouth and State of Massachusetts, have invented certain new and useful Improvements in Transmission-Shafts for Automobiles, of which the following is a specification.

This invention relates to transmitting shafting for carrying power from the engine to the driving axle in automobiles, and consists in such arrangement and construction of the transmitting shaft that the serious shocks and strains in the driving parts are eliminated and a simple form of construction provided, and in other features which will be hereinafter described and particularly pointed out in the claims.

In the embodiment of my invention shown in the accompanying drawings forming a part of this specification, Figure 1 shows my transmitting shaft assembled, and Fig. 2 is another view of the shaft, and Fig. 3 shows a shaft having two driving spring bars in place of one, and both ends arranged to slip axially.

In all machines driven by explosive engines there is a sudden shock at each explosion which is only partly absorbed by the flywheel and results in shortening the life of all parts of the vehicle and is especially destructive of tires and road surface. In vehicles driven with a propeller shaft directly to the rear axle there are other and still more destructive strains. The engine is carried by the vehicle body which is supported by springs allowing a rolling motion to the body relative to the axle, and such rolling has the effect to retard or accelerate the turning effect of the motor on the propeller shaft. If one wheel drops into a depression in the road or rolls over an obstruction the inertia of the engine and flywheel must be overcome to compensate for the faster or slower revolution of the road wheels. I provide for all strains, both those caused by the explosion of the engine and the excessive shocks from the inequality of the road, by constructing the propeller end of my transmission shaft of one or more strips of flexible material which allows a large relative torsional movement of the opposite ends of the shaft. In my shaft I also provide for the slip joint between the gear box and the cross shaft or rear axle.

$g^1$ and $g^2$ are the opposite ends of the shaft and make one member of the universal joint to connect the propeller shaft to the shaft at the gear box, and by fork $h$ to the gear at the rear axle respectively. The propeller shaft ends or forks $g^1$ $g^2$ are provided with the shanks $g^3$ turned to the diameter of the width of the flexible or spring part $g^5$ of the shaft and are milled out to make the slot $g^7$ an easy fit for the thickness of the spring. Over the spring and shanks is slipped the tube $g$ which holds the spring in the slots and prevents the parts from being thrown out of line by centrifugal force if the balance of the shaft is not perfect. When the shaft is in place the parts cannot be separated so no fastening is required, but if it is desired to have all the slip at one end the other may be fixed by pinning as shown at $g^4$ or by any suitable means. By having all the axial and torsional slip at one end the shaft may be made somewhat lighter than where slip is allowed at both ends.

From the universal joint $g^2$ $h$ the power is transmitted through the bevel gears $i^1$ $i$ and differential $i^2$ to the axle or cross shaft $i^3$. In Fig. 3 I show a shaft with the slip joint extended and two spring bars $g^5$ $g^6$ to give flexibility instead of one as in the other figures. The slot $g^7$ in the shank $g^3$ is not milled the full length of the shank so that the slip of the covering tube does not uncover the slot and as the tube is a good fit no dust can get in to clog the slip joint and it can be kept well oiled.

What I claim as new, and desire to secure by Letters Patent of the United States, is—

1. In automobile gearing, a spring shaft composed of a flat strip having axial movement in slotted shanks and a sleeve over said strip and shanks to keep the parts in alinement.

2. In automobile gearing a spring shaft composed of a flat strip having axial movement in slotted shanks.

3. In automobile gearing, a spring shaft composed of a plurality of flat strips having their ends held in slots in shank ends, and a sleeve over said shank ends and strip to hold the parts in alinement.

4. In automobile gearing a spring shaft composed of a flat strip held in shank ends, one of said shank ends being slotted to allow axial movement of said strip.

5. In automobile gearing a spring shaft composed of shank ends, one of said shank ends being slotted, and flat strips connecting said shank ends, one end of said strips being formed to slide axially in said slot.

6. In automobile gearing, a spring shaft composed of a spring strip held in shank ends, said shaft being formed to allow relative axial movement between said strip and one of said shank ends and means for holding the parts in alinement.

7. In automobile gearing, a spring shaft composed of a spring member held in shank ends, said spring member and shank ends being formed to allow relative axial movement of said shank ends, and means for holding the parts in alinement.

8. In automobile gearing, a spring shaft composed of a sleeve to preserve the alinement of said shaft, and a yielding member within said sleeve said shaft being formed to allow relative axial movement between the ends thereof.

In testimony whereof I have affixed my signature, in the presence of two witnesses.

WALTER E. TRUFANT.

Witnesses:
 GEO. D. SOULE,
 G. HOWARD SOULE.